Jan. 28, 1930. D. R. RICHARDS 1,744,986
CAR TRUCK
Filed Oct. 24, 1928 2 Sheets-Sheet 1

INVENTOR:
BY D. R. Richards.
ATTORNEY

Jan. 28, 1930.　　　D. R. RICHARDS　　　1,744,986
CAR TRUCK
Filed Oct. 24, 1928　　　2 Sheets-Sheet 2

INVENTOR
D. R. Richards.
BY
ATTORNEY

Patented Jan. 28, 1930

1,744,986

UNITED STATES PATENT OFFICE

DAVID REES RICHARDS, OF ST. LOUIS, MISSOURI

CAR TRUCK

Application filed October 24, 1928. Serial No. 314,665.

This invention relates to car trucks, and, it is an improvement over my patent for car-trucks Number 1,636,837. The object of the invention is to provide a truck which is a distinct and practical improvement to overcome certain practical objections to, and defects in the type of car trucks adapted to prevent undue friction of the car wheel flanges against the rails when rounding curves in a track.

A further object of the invention is to provide rigid side frames of the truck with toggle joints and means slidably mounted upon a bolster for uniting said toggle joints for actuating the toggle joints by lateral movement of the slidably mounted member carried by the bolster.

With the above and other objects in view, the invention consists in the novel features of construction, arrangement and combination of parts hereinafter more fully described and finally pointed out in the claims hereto appended.

Referring to the accompanying drawings forming a part of this specification, wherein like characters of reference denote similar parts throughout the several views.

Figure 1:
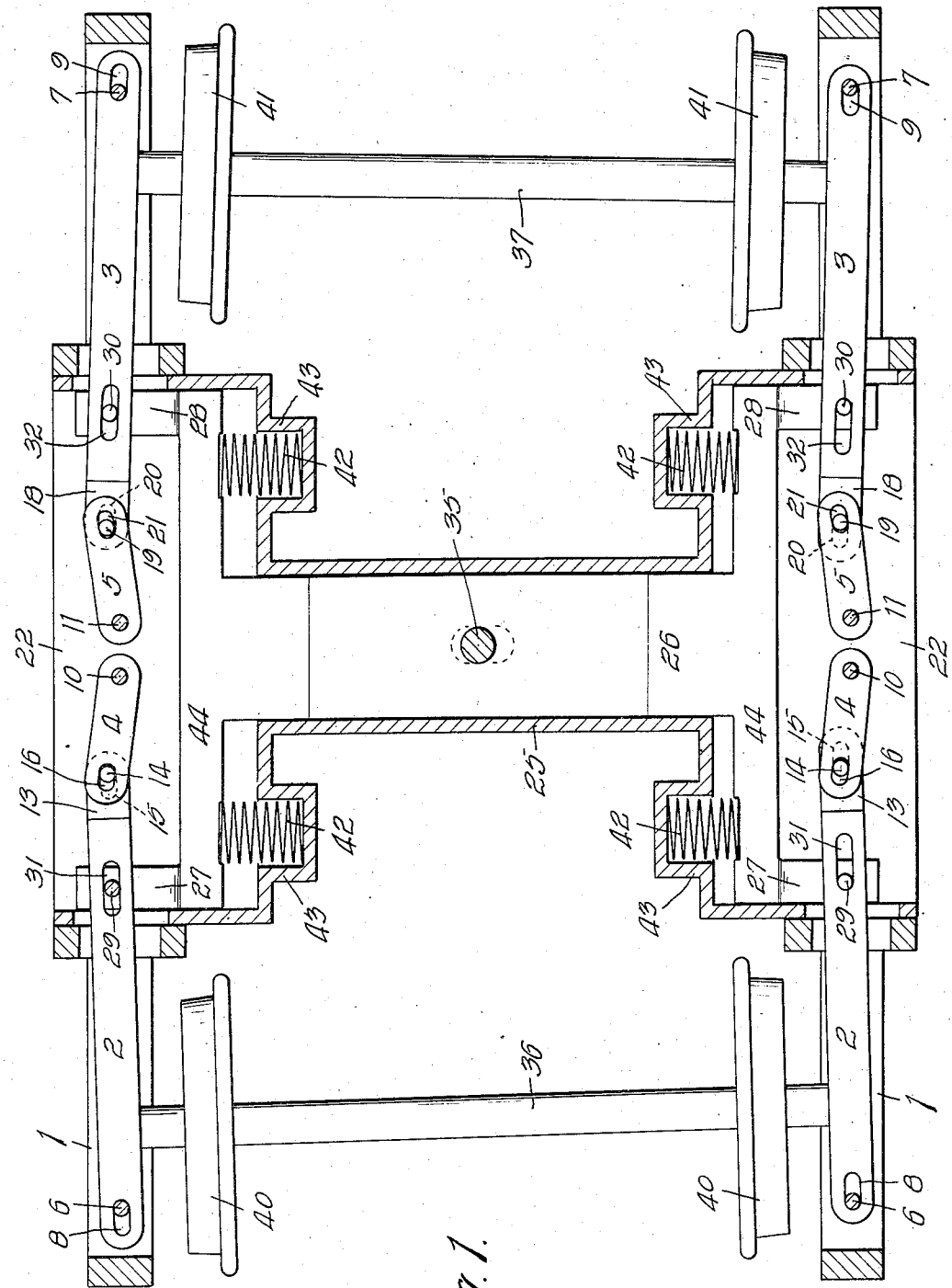
Fig. 1, is a top plan view of a car truck embodying the features of my invention, the wheels being positioned as rolling around a curved section of track, the track not being shown.
Figure 2:
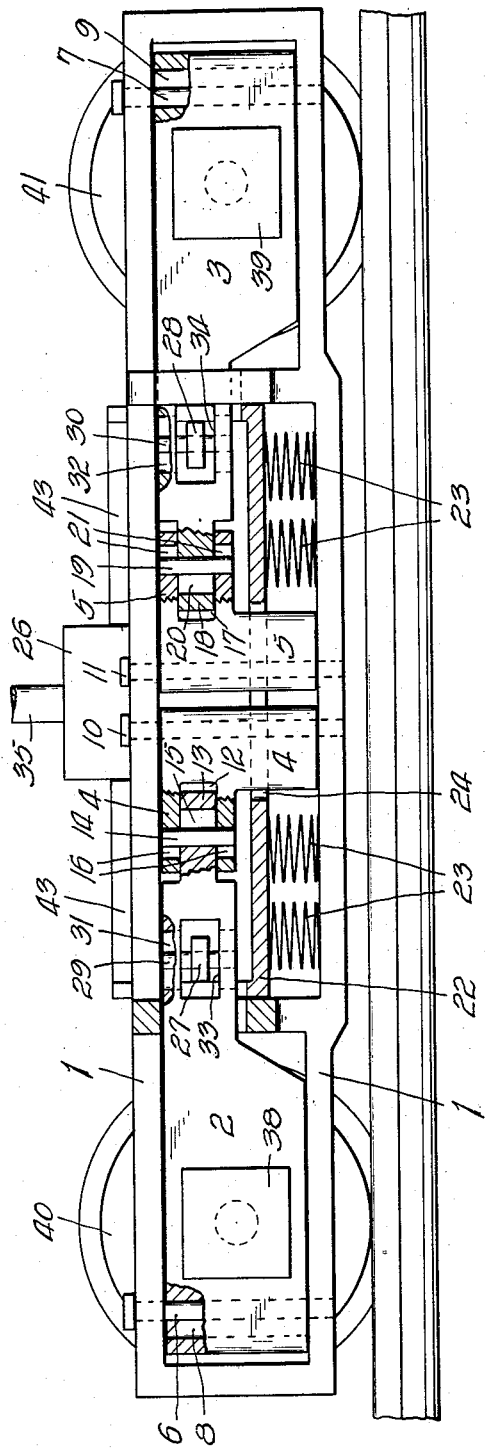
Fig. 2, is a side elevation of the truck, as it would appear upon a straight track.

In carrying out the aim of my present invention, I construct a truck by employing two suitable rigid side frame members designated 1 and 1.

The flexible members of each rigid side frame 1 comprise two like toggle arms designated 2 and 3 and two like relatively short toggle arms 4 and 5.

The toggle arms 2 and 3 are pivotally connected at their outer ends to the side frames 1 by means of suitable pins 6 and 7, respectively, passing through slotted openings 8 and 9, respectively, in the toggle arms 2 and 3, respectively. The inner ends of the relatively short toggle arms 4 and 5 are pivotally connected at their inner ends to the side frame members 1, near the middle of the frame members, by means of suitable pins 10 and 11, respectively.

The toggle arms 2 and 3 and the relatively short toggle arms 4 and 5 upon each side of the truck have complementary end portions whereby relative pivot movement is permitted between each pair of toggle members 2 and 3 and the relatively short toggle members 4 and 5, respectively. In this instance, each relatively short toggle member 4 has a receiving slot or recess 12 at its inner end to receive a tongue extension 13 at the inner end of each toggle member 2. The bifurcated inner end of each relatively short toggle member 4 and the tongue extension 13 of each toggle member 2 are pivotally united by means of a suitable pin 14 which passes through slotted openings 15 in the tongue extensions of the toggle members 2 and through slotted openings 16 in the bifurcated arm of each of the relatively short toggle members so as to permit of lateral flexing movement of the two sets of pivoted toggle members 2 and 4, as is apparent from the drawing.

Likewise each relatively short toggle member 5 has a receiving slot or recess 17 at its inner end to receive a tongue extension 18 at the inner end of each toggle member 3. The bifurcated inner end of each relatively short toggle member 5 and the tongue extension 18 of each toggle member 3 are pivotally united by means of a suitable pin 19 which passes through a slotted opening 20 in the tongue extension of each of the toggle members 3 and through slotted openings 21 in the bifurcated arms of each of the relatively short toggle members 5 so as to permit of lateral flexing movement of the two sets of pivotally united toggle members 3 and 5, as is apparent from the drawing.

A suitable bolster 22 is carried by the side frames 1 of the truck and it is mounted upon suitable springs 23 supported by the rigid side frames 1. The bolster 22 is provided with a suitable opening 24 at each end thereof so as to permit the inner ends of the relatively short toggle members 4 and 5 passing through the bolster 22, thus permitting up and down movement of the bolster relative to the side frames 1 and the toggle members 2 and 4 and 3 and 5.

The outer ends of the bolster 22 are wider than the central portion 25 thereof. The central portion 25 of the bolster 22 is adapted to carry a slidably mounted member 26 having spaced end extensions 27 and 28 for connection with the toggle arms 2 and 3, respectively, by means of suitable pins 29 and 30, respectively, carried by the end extensions 27 and 28, respectively, of the laterally slidable member 26. The pins 29 pass through slotted openings 31 in each of the toggle members 2, and the pins 30 pass through slotted openings 32 in each of the toggle members 3.

The end extensions 27 and 28 of the slidable member 26 pass through relatively horizontal large openings 33 and 34, respectively, in the toggle members 2 and 3, respectively, to permit of both pivot or lateral flexing movement of each set of toggle members or levers 2 and 3 and to also permit up and down movement of the sliding member 26 with the bolster relative to the toggle arms 2 and 3.

A king bolt 35 is carried by the slidably mounted member 26 for connection with a car body, not shown.

It will be here observed that the axles 36 and 37 are carried in journal boxes 38 and 39, respectively, which journal boxes are fixed to the toggle members 2 and 3, respectively. Axle 36 is provided with the wheels 40, while axle 37 is provided with the wheels 41.

In straight track running, it will be understood that the pins 29 and 30 assume a position midway the ends of the slotted openings 31 and 32, respectively in the toggle members 2 and 3, respectively, and that when the truck is rounding a curve, as shown in Fig. 1, that the lateral sliding movement of the member 26 upon the bolster by the car body weight pulling by centrifugal force on the king bolt is established which will cause the slidable connecting member 26 to cause the toggle members 2 and 3 upon the inner side of the curve or adjacent the inner rail of the track curve to climb toward each other thereby bringing the truck wheels 39 and 40 at the inside of the curve closer to each other than the truck wheels to the outside of the curve, thus causing all wheels to roll without undue friction of their flanges against the head of the rails.

Reverse movement of the toggle joints and the slidable member to that shown in Fig. 1, takes place when rounding a curve opposite to that shown in Fig. 1.

When the truck is traveling upon a straight track, both sets of toggle members or levers 2 and 4, respectively and 3 and 5, respectively, are in perfect alignment.

From Fig. 1 of the drawings, it will be observed that I may, or may not use suitable helical springs 42 which engage the bolster walls 43 near each end of the bolster, at one end, and engage the cross head sections 44 at each end of the slidable member 26 from which the extensions 27 and 28 extend. This arrangement, it is obvious has a tendency to remove any sudden shock to the structure upon sudden lateral sliding movement of the slidable member 26 when the truck is starting to round a curve, and, can also assist in movement of the long and relatively short toggle members back to their aligned position.

While I have illustrated and described the invention on a car truck, it is of course understood that the structure is applicable to motor driven vehicles as well as train cars.

The many advantages of the herein described invention will readily suggest themselves to those skilled in the art to which it appertains.

From the foregoing description, it is evident that a simple device for this purpose has been disclosed, but it is to be understood that I do not desire to restrict, or limit myself to the very details of the construction shown and described, which is merely illustrative, it being obvious that changes, not involving the exercise of invention, may be made without conflicting or departing from the spirit of the invention within the scope of the appended claims.

What I claim is:

1. In a car truck structure, rigid side frames, toggle jointed members pivoted to the side frames and connected to each other at their inner ends and capable of relative sidewise movement with respect to each other to facilitate rounding a curve.

2. In a car truck structure, rigid side frames, toggle jointed members pivoted to the side frames and connected to each other at their inner ends, means connected to the outer members of the toggle jointed members, a support for said means and said means capable of sliding movement upon the support to set up relative sidewise movement of the toggle jointed members with respect to each other to facilitate rounding a curve.

3. In a car truck structure, a pair of rigid side frames, toggle members pivotally connected at their outer ends to opposite ends of the rigid side frames, journals carried by each of said toggle members, axles supported by said journals, wheels carried by said axles, a bolster yieldingly supported by said side frames, relatively short toggle members pivoted to each side frame, said relatively short toggle members being pivotally connected at their outer ends to the inner ends of the aforesaid toggle members and means slidably mounted upon the bolster connected at its ends to the first mentioned toggle members for flexing all of the toggle members when the truck is rounding a curve on the track.

4. In a car truck structure, a pair of rigid side frames, a bolster yieldingly supported by the side frames, a pair of toggle members pivoted at their outer ends to opposite ends of each side frame and capable of longitudinal movement and sidewise end movement, a pair of relatively short toggle members pivoted at their inner ends to said side frames and connected at their opposite ends to the toggle members by means of pin and slot connections, a car body actuated member slidably mounted upon the bolster and connected to the toggle member by means of pin and slot connections, said slidable member capable of lateral movement when the truck is rounding a curve to impart sidewise movement to the toggle jointed members, a pair of axles journaled in the toggle members pivoted to the outer ends of the side frames and wheels carried by said axles.

5. In a car truck structure, a pair of rigid side frames, a bolster yieldingly supported by the side frames, a pair of toggle joints carried by each side frame, means slidably mounted upon the bolster connecting the toggle joints carried by one side frame with the toggle joints carried by the other side frame and adapted to impart sidewise movement to the toggle joints upon sliding movement thereof upon the bolster.

In testimony whereof, I have hereunto affixed my signature.

DAVID R. RICHARDS.